US005986711A

United States Patent [19]
Pau

[11] Patent Number: 5,986,711
[45] Date of Patent: Nov. 16, 1999

[54] MPEG DECODING WITH A REDUCED RAM REQUISITE BY ADPCM RECOMPRESSION BEFORE STORING MPEG DECOMPRESSED DATA, OPTIONALLY AFTER A SUBSAMPLING ALGORITHM

[75] Inventor: Danilo Pau, Sesto S. Giovanni, Italy

[73] Assignee: STMicroelectronics S.r.l., Agrate Brianza, Italy

[21] Appl. No.: 08/880,260

[22] Filed: Jun. 23, 1997

[30] Foreign Application Priority Data

Jun. 28, 1996 [EP] European Pat. Off. .............. 96830367

[51] Int. Cl.[6] ............................... H04N 7/12; G06K 9/40
[52] U.S. Cl. .......................... 348/408; 348/410; 348/424; 382/232; 382/236; 382/238; 364/715.02
[58] Field of Search ..................................... 348/384, 390, 348/397, 400, 401, 402, 408, 409, 410, 416, 415, 424, 425, 699; 382/232, 233, 236, 238; 364/715.02; H04N 7/12; G06K 9/40

[56] References Cited

U.S. PATENT DOCUMENTS

| 5,515,105 | 5/1996 | Lim ......................................... 348/405 |
| 5,526,052 | 6/1996 | Ar ............................................ 348/405 |
| 5,627,601 | 5/1997 | Ran et al. ................................ 348/699 |
| 5,708,732 | 1/1998 | Merhav et al. ......................... 382/232 |
| 5,777,677 | 7/1998 | Linzer et al. ........................... 348/397 |
| 5,818,530 | 10/1998 | Canfield et al. ....................... 348/400 |
| 5,844,608 | 12/1998 | Yu et al. ................................. 348/390 |

FOREIGN PATENT DOCUMENTS 0 697 794 A2  2/1996  European Pat. Off. ......... H04N 7/50

OTHER PUBLICATIONS

*Digest of Technical Papers of the International Conference on Consu Electronics,* "An Integrated MPEG–1 and MPEG–2 Decoder", IEEE (Jun. 21, 1994), pp. 324–325.

*Primary Examiner*—Bryan Tung
*Assistant Examiner*—Tung Vo
*Attorney, Agent, or Firm*—Allen, Dyer, Doppelt, Milbrath & Gilchrist, P.A.

[57] ABSTRACT

The video memory requisite of an MPEG decoder effecting a decompression of the I, P and optionally also of the B picture according to the MPEG compression algorithm and requiring the storing in respective buffers organized in said video memory of the respective MPEG-decompressed data, may be dynamically reduced by subsampling and recompressing according to a ADPCM algorithm of at least the data pertaining to the I and P pictures before coding and storing them in the respective buffers. Subsequently, the stored data are decoded, decompressed and upsampled for reconstructing blocks of pels to be sent to a macroblock-to-raster scan conversion circuit.

3 Claims, 16 Drawing Sheets

VARIANCE ESTIMATOR (2)

LUMINANCE UPSAMPLING

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| A |   |   |   |   |   |   |   |   |   |    |    |    |    |    |    |    |
| B |   | ○ |   | ○ |   | ○ |   | ○ |   | ○  |    | ○  |    | ○  |    | ○  |
| C | ○ |   | ○ |   | ○ |   | ⊙ |   | ⊙ |    | ○  |    | ○  |    | ○  |    |
| D |   | ○ |   | ⊙ |   | ⊙ | @ | ⊙ |   | ⊙  |    | ○  |    | ○  |    | ○  |
| E | ○ |   | ○ |   | ⊙ |   | ⊙ |   | ⊙ |    | ○  |    | ○  |    | ○  |    |
| F |   | ○ |   | ○ |   | ○ |   | ○ |   | ○  |    | ○  |    | ○  |    | ○  |
| G | ○ |   | ○ |   | ○ |   | ○ |   | ○ |    | ○  |    | ○  |    | ○  |    |
| H |   | ○ |   | ○ |   | ○ |   | ○ |   | ○  |    | ○  |    | ○  |    | ○  |

$D5 = MEDIAN\ (D4, C5, E5)$ $D7 = MEDIAN\ (D6, C7, E7)$ $D9 = MEDIAN\ (D8, C9, E9)$ $@ = c0*D4 + c1*D5 + c2*D6 + c3*D7 + c4*D8 + c5*D9 + c6*D10$

FIG. 15

MPEG DECODING WITH A REDUCED RAM REQUISITE BY ADPCM RECOMPRESSION BEFORE STORING MPEG DECOMPRESSED DATA, OPTIONALLY AFTER A SUBSAMPLING ALGORITHM

FIELD OF THE INVENTION

The present invention relates to an integrated video decoder based on the use of the MPEG compression algorithm and, more particularly, according to a second and more advanced version of the MPEG-1 standard called MPEG, and while having a reduced requisite of video memory.

BACKGROUND OF THE INVENTION

The MPEG-1 standard was developed in response to the industry need of implementing an efficient way of storing and retrieving a video information on storage media of the digital type, such as, for example CD-ROMs. Of course, the MPEG-1 standard is also a powerful tool for efficiently storing data on similar 15 media such as DATs, Winchester disks, optical disks and ISDN and LAN networks. A more efficient version of the standard called MPEG has been developed in support of bit rate requisites in the field of digital video transmission applications. The standard has been generally accepted for digital TV systems, for compressing TV-resolution pictures, entirely interlaced, up to a bit rate of about 15 Mbps. A special version of the MPEG standard is expected to be used in future generation HDVT systems.

The MPEG standard incorporates and uses important algorithms and criteria defined by previous international standards, such as, for example, the CCITT motion vectors determination algorithm H.261 and the ISO 10918 standard of the ISO JPEG Committee for the coding of still pictures. A definition of the MPEG standard (1 and 2), and a thorough description of the different application techniques and the relative coding and decoding systems of the data relative compressed video pictures according to the MPEG standards are described in a wealth of articles and publications on the subject, including the following:

Draft International ISO/IEC DIS 13818-2 "Information technology-Generic coding of moving pictures and associated audio information";

"MPEG coding and transport system" by Leonardo Chiariglione, Digital Television Broadcasting-Proceedings;

"The MPEG video compression algorithm" by Didier J. Le Gall, Signal Processing Image Communication, Elsevier Science Publishers B.V., Vol. 4, No. 2, April 1992;

Digest No. 1995/012, Electronics Division, Institution of Electrical Engineers-London, Colloquium on: "MPEG-2—what it is and what it isn'2";

"An Overview of the MPEG-2 Compression Algorithm" Technical Note released by SGS-THOMSON MICRO-ELECTRONICS (An 529/0294);

Datasheet "STi3500A" Datasheet of SGS-THOMSON MICROELECTRONICS; and

"STi3520A—Advanced Information for an MPEG Audio/MPEG-2 Video Integrated Decoder" (June 1995).

According to a typical architecture of an MPEG-2 decoder, such as that shown in FIG. 3 of the publication No. STi3520A relative to an MPEG Audio/MPEG-2 Video integrated decoder marketed by SGS-THOMSON MICROELECTRONICS, herein reproduced as FIG. 1, there exist well-defined requisites of video memory, that is, the capacity of an external DRAM memory that, for a PAL and NTSC application, can support 16 Mbits PAL video signals. These requisites of video memory can be estimated as follows.

Considering that both the MPEG-2 video decoder and the MPEG audio decoder access a unique external DRAM memory of 16 Mbits through a common interface, the audio decoder may require access to only 131,072 bits leaving the remaining 16,646,144 bits available for satisfying the requisites of the MPEG-2 video decoder. The video memory can be configured as follows:

A "Bit buffer": that is a buffer for compressed data that the MPEG-2 standard fixes at 1.75 Mbits plus an extra amount, for example of 983.040 bits, in consideration of a nonideal process of decompression being actually carried out;

A first "I-frame buffer" for the decompressed Intra-picture or briefly I-picture, in a 4:2:0 format;

A second "P-frame buffer" for the decompressed Predicted-picture or briefly P-picture, in a 4:2:0 format; and A third "B-frame buffer" for the decompressed Bidirectionally Predicted Picture or briefly B-picture, in a 4:2:0 format, eventually optimized so to require a reduced amount of memory, which is 0.7407 or 0.6111 of a frame respectively in a PAL or NTSC system.

According to the actual MPEG-2 standard technique, and despite dealing with an I, P or B-picture dependently on the type of video standard, each "frame buffer" in the 4:2:0 format may occupy an amount of memory given by the following table.

| | | | |
|---|---|---|---|
| PAL | 720 × 576 × 8 for the luma (luminance) (Y) | 3,317,760 bits | =4,976,640 bits |
| | 360 × 288 × 8 for the U chroma (chrominance U) | 829,440 bits | |
| | 360 × 288 × 8 for the V chroma (chrominance V) | 829,440 bits | |
| NTSC | 720 × 480 × 8 for the luma (luminance) (Y) | 2,764,800 bits | =4,147,200 bits |
| | 360 × 240 × 8 for the U chroma (chrominance U) | 691,200 bits | |
| | 360 × 240 × 8 for the V chroma (chrominance V) | 691,200 bits | |

Therefore, in a PAL system which representing the most burdensome case may serve as a reference example, the actual total amount of memory required will be given by:

5 1,835,008+835,584+4,976,640+4,976,640+(4,976,640*0.7407)= 16,310,070 bits.

This calculation considers a 0.7407 optimization of the B-picture frame buffer.

A further optimization may include undertaking the decompression of the B-picture without resorting to a storage step in the external RAM by carrying out an equivalent function internally in the integrated decoder device by a dedicated circuit block functionally placed upstream of the Display Unit.

Considering this further optimization, the video RAM requirement drops to:

1,835,008+835,584+4,976,640+4,976,640=12,623,872 bits

Where the B-buffer is realized within the same chip containing the "core" of the decoder being required to convert the scanning of each 8*8 block defined in the MPEG-2 compressed data stream, in that of each row of the picture (field or frame) required by the video display process of the picture itself. Such conversion macrocell is commonly called "MACROBLOCK TO RASTER SCAN CONVERTER".

In the prior European patent application No. 96830106.9, filed on Mar. 11, 1996, in the name of the same assignee, a method and related device were described that allowed for a remarkable reduction of the above cited video memory requisite to about 8 Mbits. The idea behind the invention that was described and claimed in the above identified previous patent application is the recognition that the amount of memory required by the MPEG decoding process as stated in the above calculations, can be remarkably reduced when allowing for: a recompression of the pictures used as a reference for the prediction (I-picture and P-picture for the case of the standards MPEG-1 and MPEG-2), after the MPEG decompression and before they are temporarily stored in the external video memory; and their decompression when they are read from the external memory.

SUMMARY OF THE INVENTION

It has now been discovered and represents the object of this present invention that the video memory requisite may be synergically minimized, reducing it in practice to only 4 Mbits, by carrying out a data subsampling, prior to the ADPCM recompression used to reduce to 8 Mbits the memory requisite, of at least the I and P images after MPEG decompression and before coding and storing these data in the respective video memory buffers. Subsequently the decoded data, decompressed by blocks of pels during the reconstruction phase and before being sent to a "MACROBLOCK TO RASTER SCAN" conversion unit, are upsampled congruently to the subsampling factor used before their recompression.

It has been found that the degrading of the picture quality (picture definition) following this subsampling operation and subsequent data upsampling, remains approximately within limits that are hardly noticed when the picture is displayed on a T.V. screen. Furthermore, the "core" architecture of the data processor, according to the present invention, allows for a simplified implementation of proper means that select a mode of full reduction of the video memory requisite by carrying into effect such subsampling and upsampling operations, or disable this optional mode of minimization of the memory requisite retaining a higher picture quality with a video memory requisite of 8 Mbits, which still remains considerably lower than the memory requisite of prior known systems.

Basically, this invention permits the implementation of an "adaptive" system for automatically managing video memory resources in order to optimize the performance of the device "core" in function of the operating conditions and accordingly of the prevailing memory requisites. In practice, the ADPCM recompression factor may be varied in such a way of optimizing the space available within the external video memory.

If the memory space is enough for the intended purpose, the memory requisite reduction macrocell and object of the present invention is bypassed, preserving the full quality of the picture as produced by the MPEG decoder system. In case of insufficient memory, the system implements the reduction to the 8 Mbit memory requisite algorithm described in the preceding application No. 96830106.9 for recompressing at least the I and P pictures. Therefore, assuming a 16 Mbit external memory, the remaining memory space may be used for storing the picture or the graphics of an "on-screen display system" (for such application as TELETEXT, etc.).

Finally, if the availability of video memory is further reduced, the system enables the algorithm based upon the subsampling object of the present invention to further reduce the memory requirement down to about 4 Mbits. The recompression algorithm having a maximum memory requisite of 8 Mbits, according to the method described in the previous patent application No. 96830106.9, is in practice implemented by simply bypassing the subsampling system of the present invention. Of course this activation or deactivation of the subsampling step is dynamically and automatically carried out by the system to fully optimize the use of the video memory.

The method of the invention includes as already described in the previous patent application No. 96830106.9, in recompressing at least the I-pictures and the P-pictures while assuming that the decompression of the B-pictures be made without recourse to a storage phase of the relevant data in the external video memory by employing a "MACROBLOCK TO RASTER SCAN" conversion buffer of the B-pictures after the MPEG decompression and before sending the pictures to the Display Unit. Such an I and P picture recompression phase is carried out in compliance with an adaptive differential pulse code modulation (ADPCM) scheme.

The ADPCM recompression of the I and P pictures is in response to the following requisites:
Effectiveness:
The amount of memory occupied by the compressed pictures added to that used for carrying out their decompression is lower than the total memory used for decoders not requiring the ADPCM recompression.
Efficiency:
(1) the recompression of the pictures is carried out in a simple fashion so that the total cost of the device does not increase sharply if compared to the saving deriving from not using part of the memory;
(2) the quality of the reconstructed pictures undergoes a negligible degradation or anyway acceptable in terms of cost/quality; and
(3) optionally and preferably the number of the primary clock cycles, which regulates the functioning of the external memory, required to draw from this external memory the predictor for the motion compensation process can be advantageously reduced. To obtain this and according to a preferred embodiment, a part of the compressed information is stored in the chip of the decoder's "core", in a dedicated buffer as hereinbelow illustrated.

In practice, a recompression according to the ADPCM scheme is carried out on the data of the chrominance and luminance blocks, as output by the discrete cosine inverse transform processing circuit of the MPEG decompression block (for the I-pictures and, after motion, for the P-pictures) by coding the data. For example, the data may be coded according to a four bit compression of luminance blocks (e.g. of 8*8 pixels each) and a three bit compression of chrominance blocks (e.g. of 8*8 pixels each). optionally, each block of n*m pels of luminance (Y) and/or chrominance U and V may also be preventively subdivided into two subblocks of (n/2)*m pels thus to implement the process of bufferization/subsampling/ADPCM compression/coding/ writing in the memory/reading from the memory/decoding/ ADPCM decompression/upsampling on such data subblocks.

The ADPCM compression method, as explained below, meets the above stated requisites, to which should be added a certain degree of flexibility in compressing so to allow in a very simple manner the modification of the coding and decoding circuits in case they are to be optimized for a different level of compression. Preferably the subsampling of data is undertaken according to a "quincunx" grid, as illustrated later in greater detail. Upsampling the data after ADPCM decompression requires the generation of samples (pels) that were not stored during the coding phase. To do this use is made of the values relative to the adjoining samples (pels) and included within a certain active area, purposely defined, as described below.

In the present context, the abbreviation "pel" is after used instead of "pixel".

According to an aspect of the invention, an MPEG video decoder interfacing with a control bus and a video data processing bus pertaining to video pictures to be written in and read from respective storage buffers, may typically comprise a first buffer of the "first-in-first-out" type for the acquisition and writing of compressed data in a respective first buffer for video bits of an external DRAM memory, managed by a relative controller; a detecting circuit of a picture initial code, synchronized by a control circuit; a bidirectional buffer for storing On-Screen Display (OSD) data; a variable length decoding block of the compressed input data stream; a decompression pipeline of the data decoded by the variable length decoding block, comprising a "run-length" type decoding stage; a 10 circuit undertaking an inverse quantization function; a processing circuit of the inverse discrete cosine transform (I_DCT) and a predictor value generation network. The decoder is characterized by further comprising: a buffer for data macroblocks; a quincunx subsampling circuit; and a circuit for coding and recompressing, according to an adaptive differential pulse coding modulation (ADPCM) scheme, that decompresses the I and P pictures, encoding the I_DCT block output data that, after motion compensation, are written in the respective buffers by the external memory; a circuit for decompressing and decoding the output (ADPCM) data from the I_DCT block relative to the I and P pictures so recompressed, read from the respective buffers of the external memory, capable of generating a video data stream relative to the I and P pictures, together with the outcoming data from the I_DCT relative to the decompressed B-pictures; a buffer for such video data stream; and an upsampling circuit of said video data stream.

According to an embodiment of the invention, the coding and recompressing circuit may comprise: an acquisition buffer of the decompressed I_DCT data produced by the MPEG decompression block; a circuit that assesses the energy content of the buffer and generates a digital variance value of the pel values of the different data blocks output from the I_DCT block to be stored in the respective buffer of the external memory; a multilevel quantizer, coherently conditioned by the actual or current digital variance value generated by said circuit; a differentiator capable of receiving through a first input the I_DCT data stream produced by the MPEG decompression block and, through a second input, a predictor value and of producing an output data stream to be sent to the input of the quantizer; and a coding and write circuit of the recompressed data in the respective buffers of the external memory capable of receiving as input the output stream of the quantizer. The coding and recompressing circuit may further comprise: a network for the generation of the predictor value comprising a multiplexer capable of receiving through a first input the I_DCT input data stream and through a second input the predictor value generated by the network; an adder capable of receiving through a first input the output stream of the quantizer, through a second input the data output by the multiplexer and of producing an output stream of sum data; and a limiter circuit capable of receiving as an input said sum data stream produced by the adder and followed in cascade by a circuit that generates the predictor value which is supplied to the second input of the differentiator stage and of the multiplexer.

The decompressing and decoding circuit can be provided by a: decoding circuit capable of receiving through a first input a compressed and coded data stream coming from the respective external memory buffers and through a second input the relative variance value previously stored in the same external memory buffers; and a decompression network made up of an adder summation stage capable of receiving through a first input the decoded data stream output by the decoding circuit and through a second input the predictor value relative to the decompressed pel value, already generated at the output of the adder, followed by a limiter of the pixel values.

Of course, the dimensions in pels of the luminance and chrominance blocks of data, the format of the I_DCT data according to the MPEG compression scheme, the format of the recompression data of the already decompressed I and P pictures according to the ADPCM scheme, as contemplated by the invention, as well as the format of the estimated digital variance value and the number of levels of the relative quantizer can be different from those indicated by way of example in the present description and will normally be defined based on design preferences of the video decoder or receiver.

BRIEF DESCRIPTION OF THE DRAWINGS

The various aspects and relative advantages of the invention will be even more evident through the following description of an important embodiment and by referring to the attached drawings, wherein:

FIG. 15 illustrates the 8*8 block after ADPCM decompression and the realization among the pixels that allows for the median upsampling.

DETAILED DESCRIPTION OF THE PREFERRED EMBODIMENTS

Figure 1:
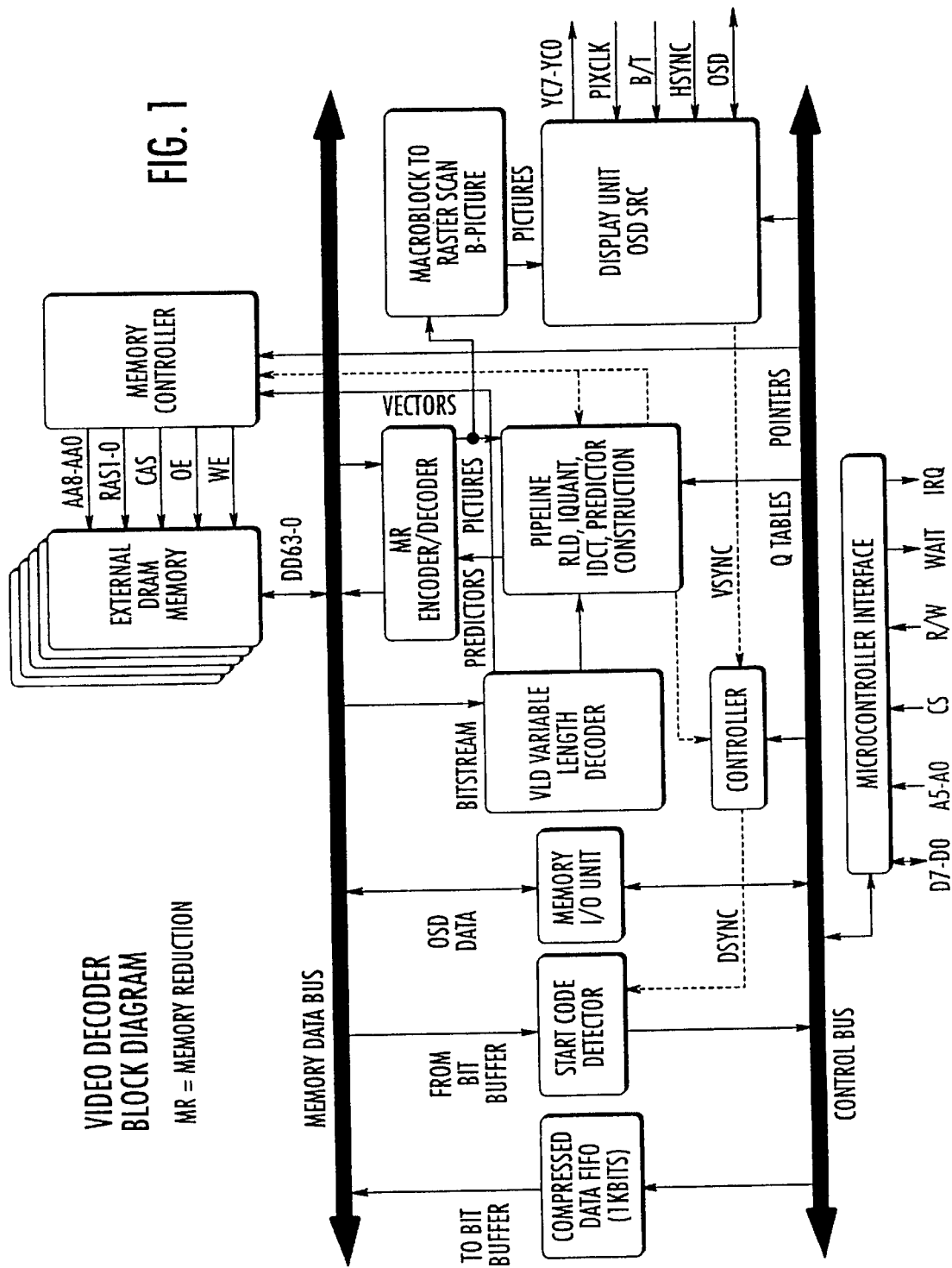
FIG. 1 is a block diagram of the "core" of a video decoder according the present invention.

The sample embodiment shown in the figures refers to an MPEG video decoder usable in PAL and NTSC applications, and is capable of supporting 16 Mbits PAL and that starting from such a requisite is able to reduce the dimensions of the required video RAM down to approximately 4 Mbits. According to the architecture shown in FIG. 1, the MPEG video decoder ("video core") accesses an external DRAM memory through an interfacing memory data bus which can be shared by an MPEG audio decoder for accessing a respective audio buffer that may be organized in the same external DRAM. Besides interfacing with the memory data bus, the video decoder also interfaces with a Control Bus, through which a system's control microprocessor intervenes through the interfacing block (Microcontroller Interface). The video decoder may also include a controller (CONTROLLER) for the management of the synchronisms (DSYNC) and (VSYNC).

According to a conventional MPEG architecture, the decoder comprises: a "first-in-first-out" buffer (Compressed Data FIFO), for instance with a capacity of 1 Kbits for the acquisition and the writing of compressed data in a first buffer (Bit buffer) of the external DRAM, a Start Code Detector, a memory bidirectional buffer (Memory I/O Unit) for On Screen Display (OSD), a first variable length decoder (VLD) block for the compressed input data stream (BitStream).

The MPEG DCT data decompression is carried out by the relative decompression block (Pipeline-RLD, I_QUANT, I_DCT, Predictor Construction. The pipeline typically includes a "run-length" decoding stage (RLD), an inverse quantization circuit I_QUANT), an inverse discrete cosine transform processor I_DCT and a network for the generation or construction of a predictor value (Predictor Construction).

In a known architecture, the blocks of I_DCT data output by the I_DCT processing circuit that calculates the inverse discrete cosine transform and the motion compensation relative to the I, P and B pictures, were written in the respective buffers of the external memory in a coded form, that is, as words of a certain number of bits before being decoded and sent to the Display Unit. By contrast, according to the present invention, the decompressed I_DCT data relative to the I and P pictures may be subsampled or not before being ADPCM recompressed and thereafter coded and written in the respective buffer of the external memory by means of a block referred to as a whole in FIG. 1 as MR Encoder/Decoder. The recompressed data read from the DRAM are then decoded, decompressed and eventually upsampled to be sent, together with decompressed B-pictures, to the display unit. Optionally, an internal auxiliary memory (MR Memory) may be realized to optimize the management of the external memory as specified in the previous European Patent application No 96830106.9 whose content is herein incorporated by way of reference and as it will be illustrated in the ensuing description.

The optional presence of an auxiliary internal memory (MR Memory) has its own relevance during those phases in which the system adaptively enables the reduction of the video memory requisite to 8 Mbits, that is, by enabling only the ADPCM recompression while disabling the subsampling algorithm prior to ADPCM recompression according to the present invention. Under this operating mode, as thoroughly described in the previous European Patent application, the use of the external video memory is optimized by taking into account the need of storing words of several bits less than 16—the usual number into which is organized the external video memory. This opportunity of optimizing is no longer needed when the system enables a reduction of the full memory requisite to about 4 Mbits by enabling the subsampling algorithm before the ADPCM recompression.

In the preferred case of a "direct" reconstruction of the B-pictures this is then realized as follows: the ADPCM compressed I and P predictors are read from the external DRAM memory and ADPCM decompressed in order to perform motion compensation of the B-picture that is currently being MPEG decompressed by the "pipeline", and subjected to a median subsampling procedure; and the macroblocks of I_DCT data so reconstructed are sent to the conversion circuit "MACROBLOCK TO RASTER SCAN", upstream of the display Unit of the diagram shown in FIG. 1 and they are then displayed. This procedure does not require any buffer in the external memory destined to store the B-picture, because such a buffer is present in the macrocell "MACROBLOCK TO RASTER SCAN CONVERTER B-PICTURE".

In line with a fundamental aspect of the system of this invention characterized by its adaptability to changing conditions of video memory availability (for example by supposing of having available a 16 Mbits external memory), the system is perfectly able to deactivate algorithm that reduces the memory requisite through ADPCM recompression, coding and eventual writing in the video memory, or otherwise to activate it. This operation is implemented by controlling two multiplexers through the microprocessor.

Figure 2:
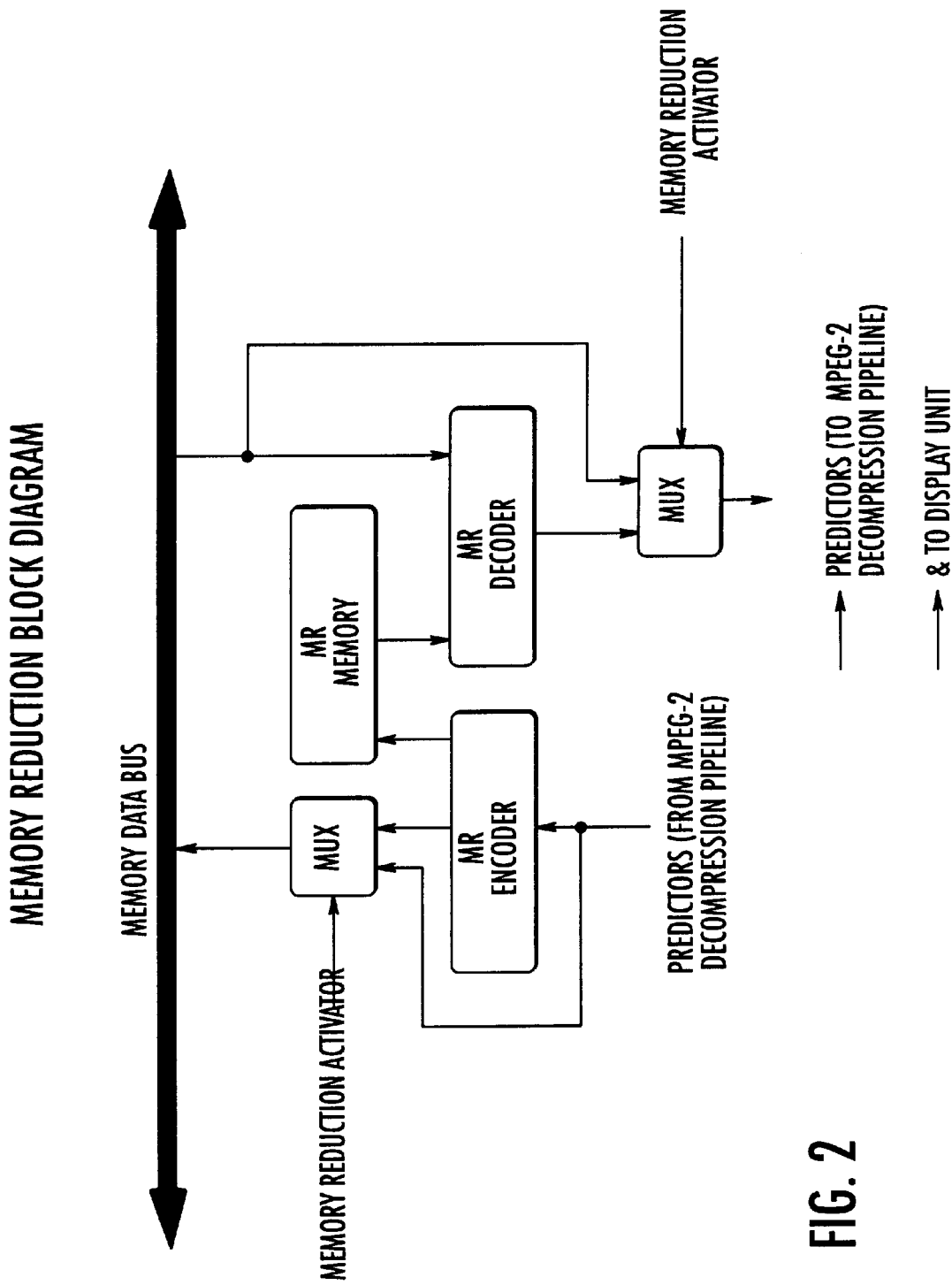
FIG. 2 shows a detail of the MR Encoder/Decoder of the general scheme of FIG. 1.

The enabling/disabling scheme of the function that reduces the memory requisite in an adaptive manner through the controlling microprocessor, is illustrated in FIG. 2. In this partial view are shown in detail the two multiplexers controlled by the microprocessor that perform the activation or deactivation of the ADPCM recompression system through the MR Encoder and MR Decoder blocks. The detailed view of the MR Encoder/Decoder block of FIG. 1 also shows an Embedded MR Memory for the optimization of the external memory management, in line with the cited previous European Patent application.

Figure 3:
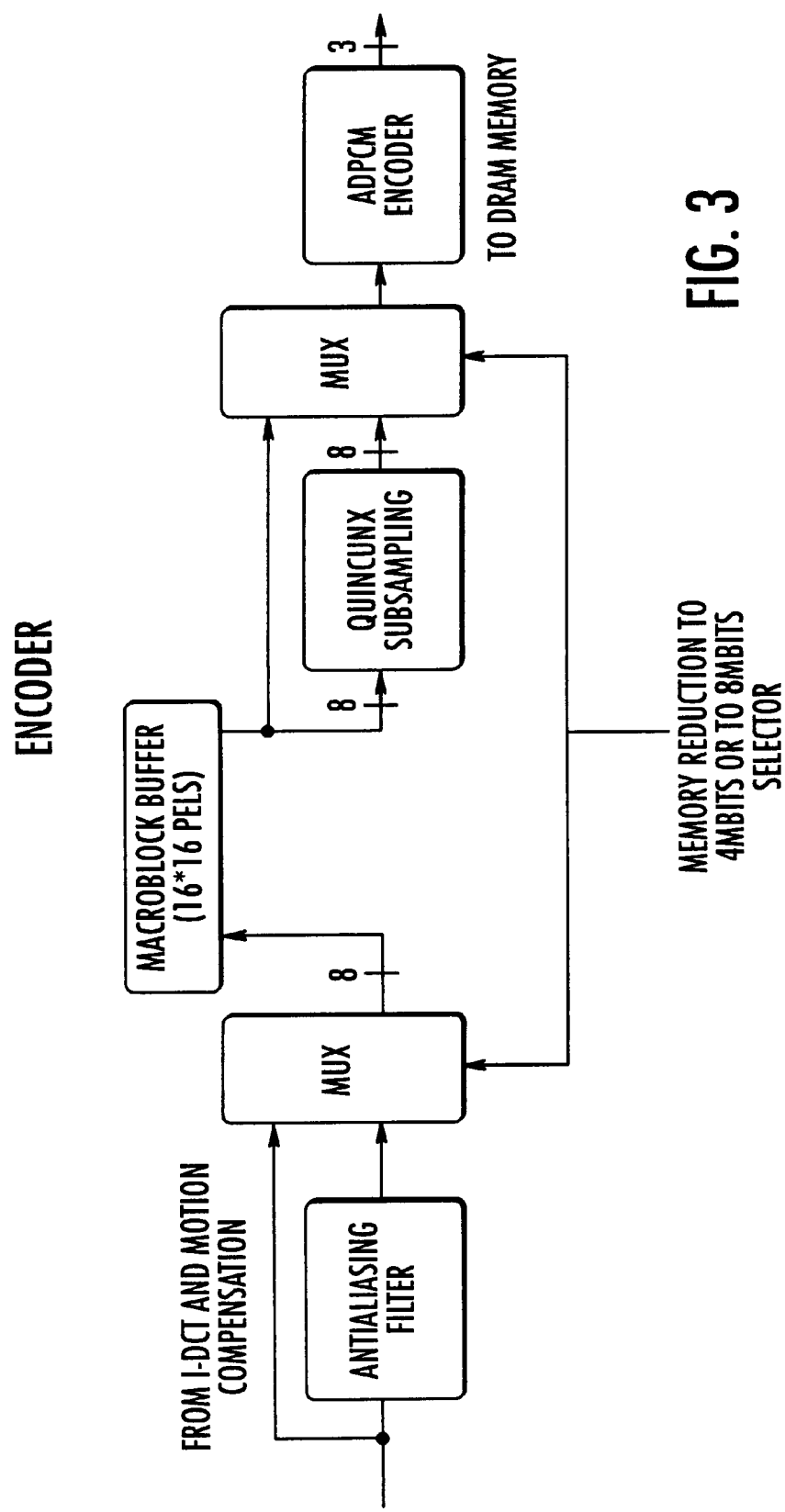
FIG. 3 is a scheme of the bufferization scheme, subsampling, recompression and ADPCM coding.

A feature of the bufferization, "quincunx" subsampling and recompression block of FIG. 1 relative to the data output by the I_DCT block (for the sake of brevity called I_DCT data) pertaining to the decompressed I and P pictures, is shown in FIG. 3. The diagram of FIG. 3 also includes two multiplexers MUX to automatically actuate the selection between a reduction of the memory to only 4 Mbits through a data subsampling before ADPCM recompression or to 8 Mbits through ADPCM recompression alone, in practice by disabling the subsampling algorithm.

The quincunx subsampling realized within the homologous block, may take place by discarding one of every two pixels belonging to each luminance data of a video line (row) to be written in the RAM. The process is repeated line by line thus "offsetting" the position of a pixel.

Figure 4:
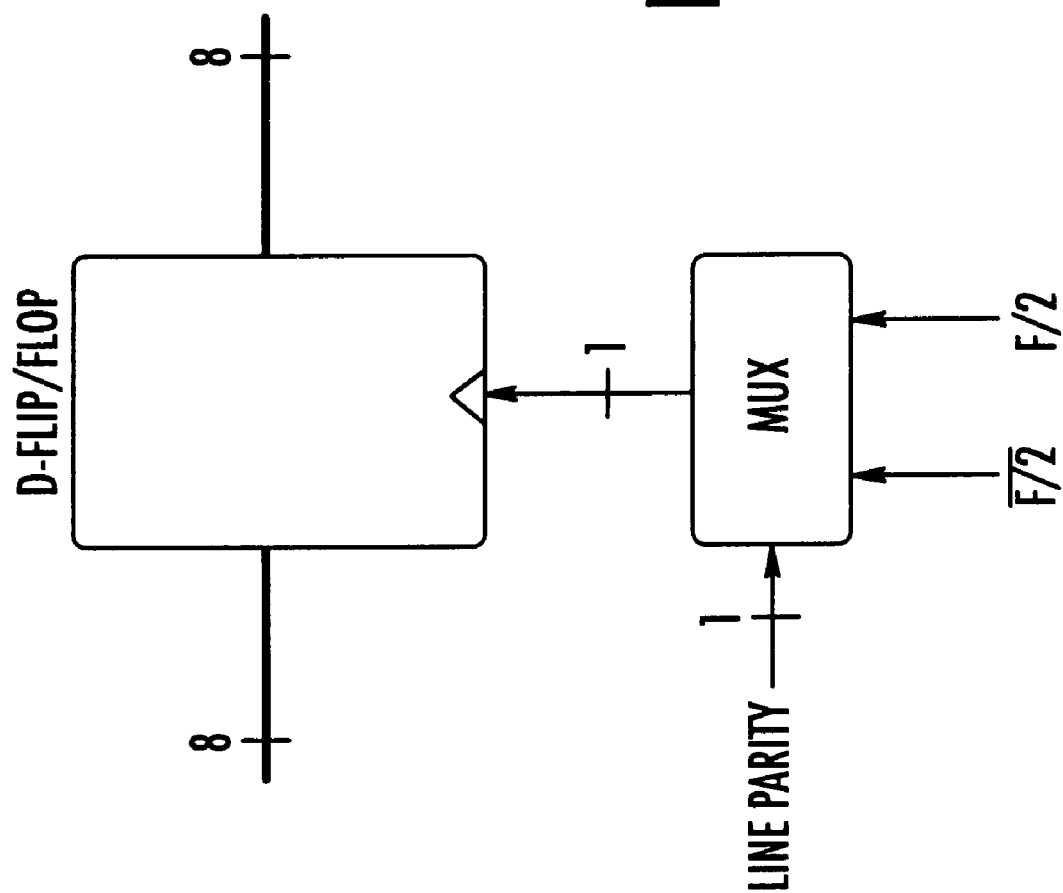
FIG. 4 shows a possible scheme of the quincunx subsampling block.

As diagrammatically shown in FIG. 4, the quincunx subsampling may be simply realized by directing the pixel stream through an array of D-flip/flops, functioning in parallel, driven by a half-frequency clock if compared to the frequency of the pixel stream. This half-frequency clock may be selected by a multiplexer MUX, at the input of which are applied the complementary clock signals of F/2 frequency if compared to the basic frequency F of the pixel steam through the flip-flop bank. The signal of line parity commands the clock selection thus producing a quincunx subsampling grid.

Figure 5:
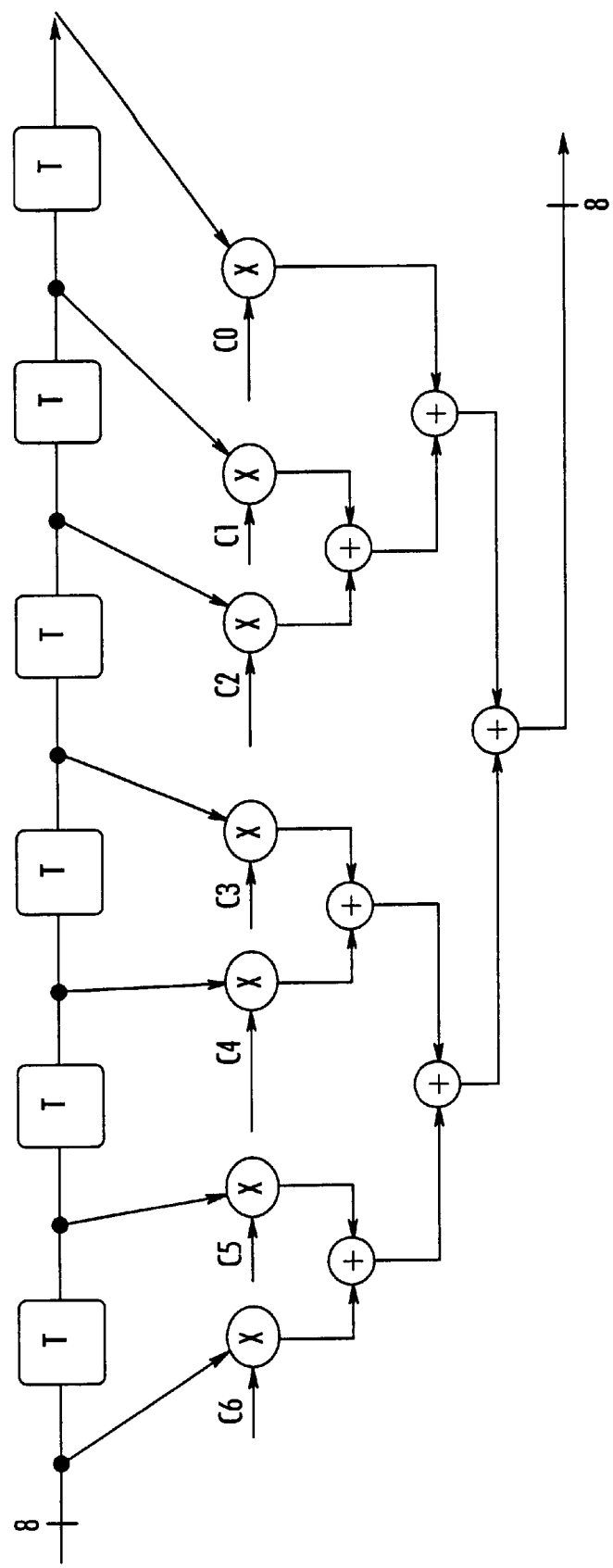
FIG. 5 is a particular feature of the ANTIALIASING filter block of FIG. 3.

The quincunx subsampling technique assumes that upstream of the subsampling stage in relation to the digital data stream, a frequency reduction of the band of the video signal to comply with the subsampling algorithm. In case that the subsampling reduces to half the effective number of samples of the data of a videoline, the band will also need to be reduced to half. Such a necessary filtering is performed by the Antialiasing Filter whose functional scheme is given in FIG. 5. The filtering is performed by generating the sum of the products between appropriate coefficients and adjacent pixels. The T registers may be D-flip/flops that store these adjacent pixels for the time necessary to the filter to output the filtered pixel. These adjoining pixels are multiplied by preestablished coefficients and added to produce the output datum.

Figure 7:
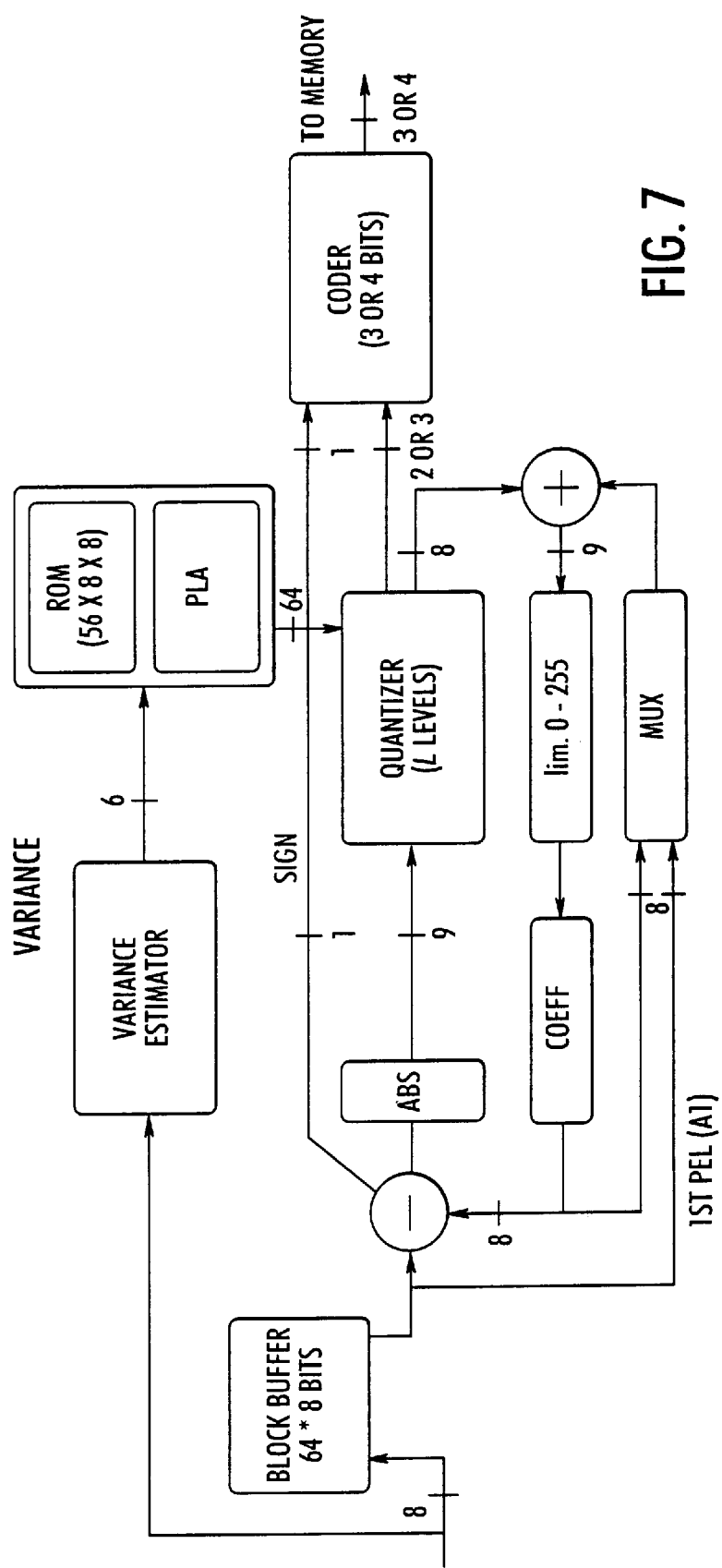
FIG. 7 shows a more detailed scheme of the ADPCM recompressing and coding circuit block.

Now referring to FIG. 7, the ADPCM encoder block comprises a 64*8 bit buffer (block buffer) for the acquisition of the I_DCT input data. A dedicated circuit (Variance Estimator) calculates the average pels value of each block of the I_DCT input data and the average of the sum of the absolute values of the differences between each pel of the I_DCT data block. With such parameters it is possible to assess the variance of the input data (pels) block.

Figure 8:
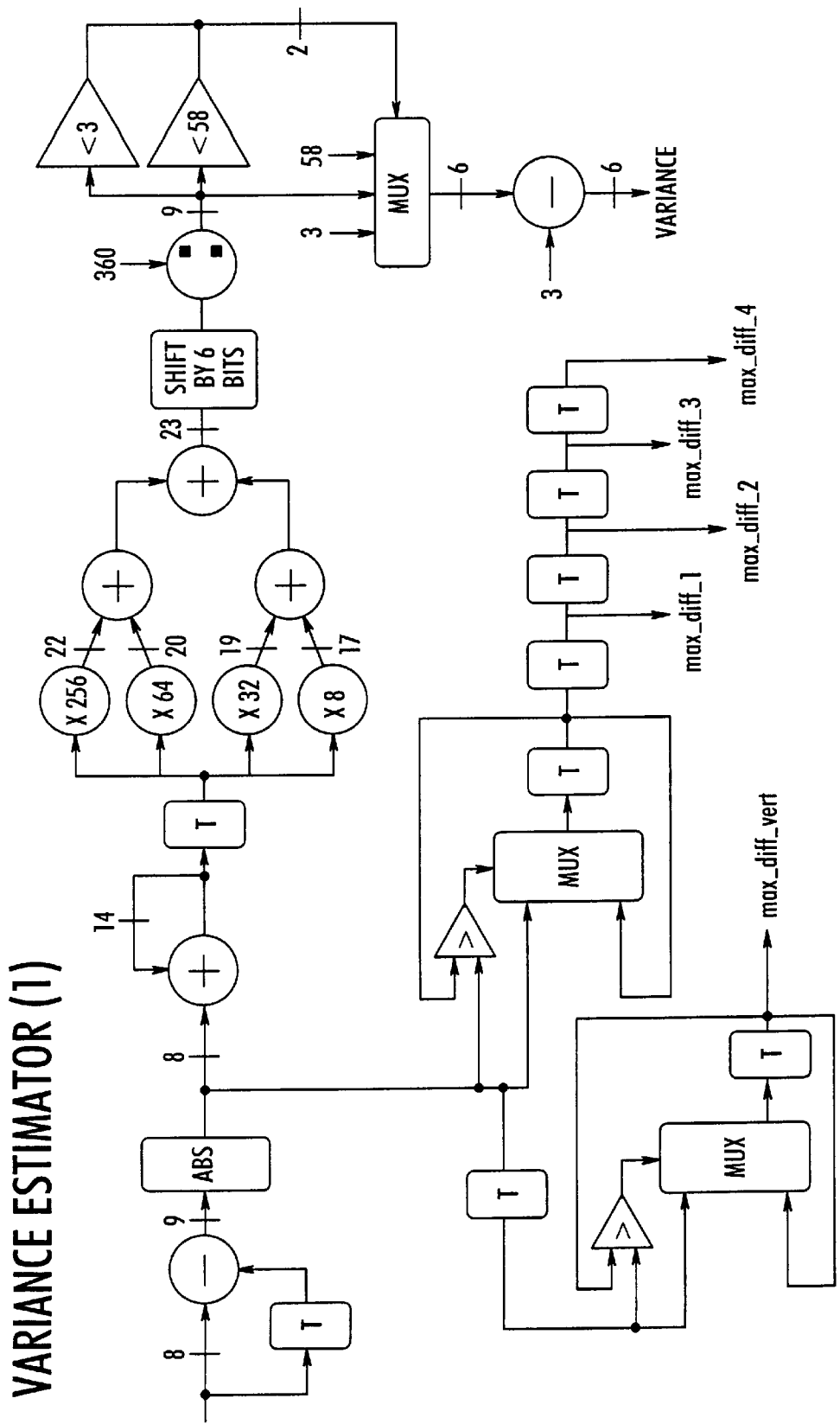
FIGS. 8 and 9 show a detailed functional scheme of the variance prediction block of the scheme of FIG. 7.
Figure 9:
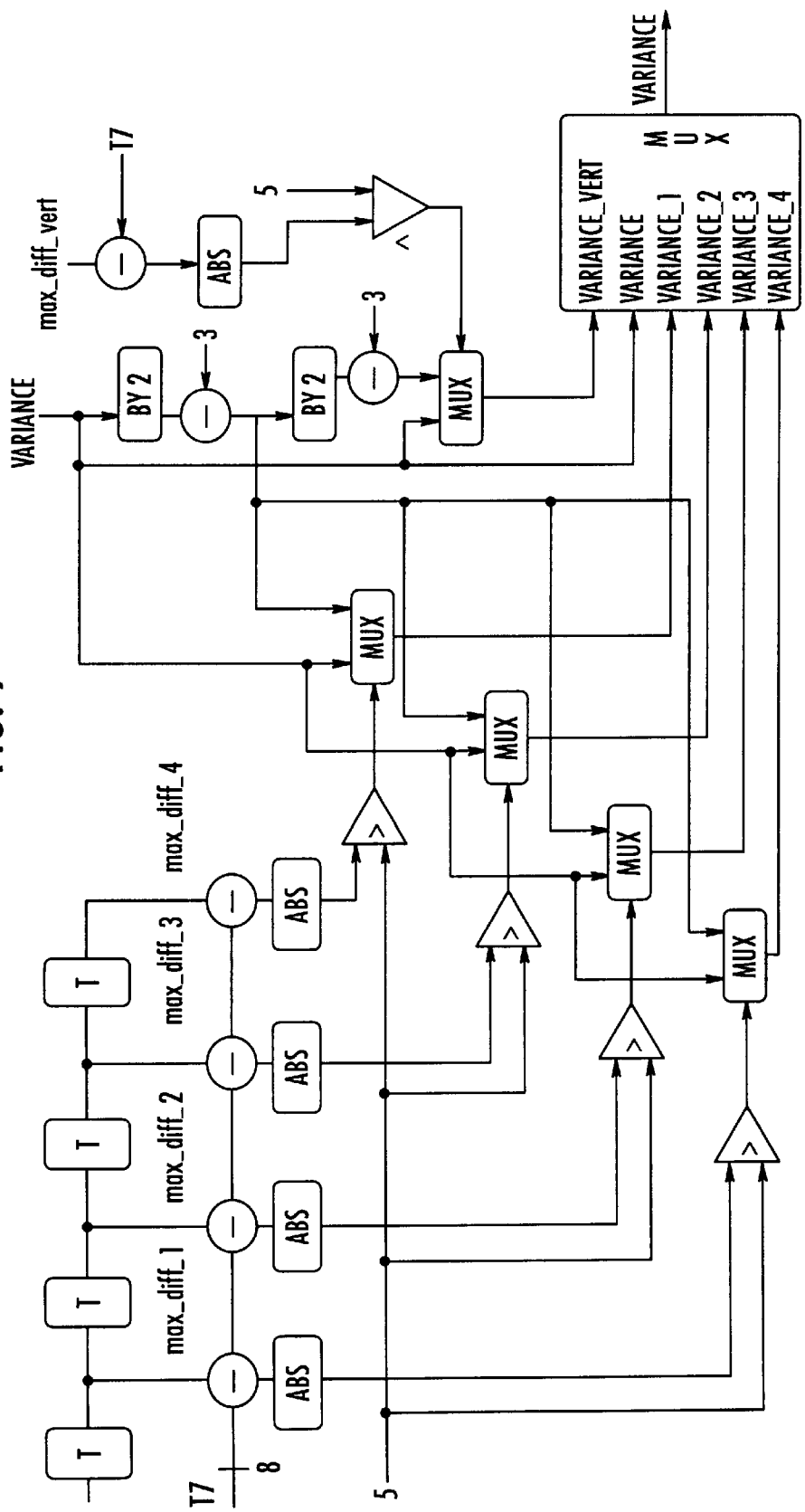

FIGS. 8 and 9 show a detailed functional scheme of the variance prediction block according to a preferred embodiment. The detailed scheme of FIGS. 8 and 9 of the variance predictor block makes use of a standard terminology of immediate understanding by a person skilled in the art. A further definition and description of each of the stages that constitute the block diagram of the variance estimation will be readily understood by those skilled in the art without further description herein.

The ROM (Read Only Memory) block may be composed by 56 rows being each of 8 columns (8 bit) as indicated in the illustrated example. In this programmable (non volatile) ROM are stored the coefficients of luminance and chrominance quantization. Indeed, for example, the luminance is 4 bit coded, meaning that each word selects one among 16 possible coefficients of a line that is selected by the VARIANCE ESTIMATOR. These coefficients are symmetric in respect to zero thus the rows contain absolute value coefficients (8 rather than 16).

As an alternative to the use of a programmable ROM, it might be cheaper in terms of the area of silicon utilized, the use of a programmable logic array PLA that receiving as input a certain variance value outputs the values of the required coefficients. The PLA may be arranged in AND, OR, NOT gates such as to carry out the Boolean conversion of the variance in a plurality of coefficients.

The DPCM compression network that generates a predictor value to be applied to the relative input of the differentiator (−), is made of a two-input multiplexer (MUX), to a first input of which is applied the value of the first pel (A1) of each block of I_DCT input data, whereas the predictor value, generated by the network, is applied to the other input. The adder (+) receives through a first input the output stream of the quantizer circuit (quantizer) to be added to the output value of the multiplexer (MUX). The result of this sum is applied to the input of a limiter circuit (LIM. 0–255), whose output stream is supplied to the input of a circuit that generates the predictor value (COEFF).

The limiter stage (LIM. 0–255) may be provided by an adequate combinatory logic circuit. The use of such a stage is necessary for compressing eventual maximum pixel values beyond a given limit, which, in the case of 8 bit coding of pixel values, may be fixed at 255. Indeed during the compression and decompression phases, the pixel value may occasionally exceed the limit of 255 and, if this is the case, the limiter circuit restores the maximum value of the pixel within the set limit. A three bit write coding (CODER) circuit for I_DCT chrominance data and four bit coding circuit for luminance I_DCT data receive the output stream of the QUANTIZER and write the so recompressed data in the respective buffers of the external memory.

With the purpose of better illustrating the functions of the coding and ADPCM recompression block, a detailed description follows explaining the various block functions.

ADPCM RECOMPRESSION

Let I be a digital picture represented by a matrix of M rows and N columns of pixels, and let I(x, y) the pixel defined by the row y and the column x, defined as an integer number by a number B of bits (binary figures). Let picture I be subdivided in rectangular blocks having an RxC size (R rows and C columns). The maximum efficiency for the compression is obtained if R and C are chosen among the integer dividers of M and N, respectively.

The algorithm carries out a compression of each block, that is, a reduction of the number of bits necessary for the representing of the block itself, exploiting just the data extracted from the block itself. This is done with the aim of simplifying the access to the block in the stream of compressed data and also the decompression of the block itself.

The ADPCM compression mechanism exploits the correlation existing among adjacent pixels of a picture so to reduce the number of necessary bits for the binary description of the picture itself. It is indeed possible to approximate the value of a pixel by appropriately combining only the values of the pixels next to it of the quincunx subsampled picture (without using thus the value of the pixel itself), so to create what is commonly called "prediction" of the pixel.

Therefore, it is possible to reduce the amount of binary figures necessary for a digital representation of a picture by defining the prediction mechanism and therefore by appropriately coding, rather than each pixel, the prediction error alone. The more precise the prediction of the pixel's value, the lower is the entropy of the prediction error, that is, the lower is the number of bits necessary for coding the latter.

Considering for example, an arrangement for the scanning of the pixels of each block according to a scanning scheme such that for each pixel, with the exception of the first, there exists another, preceding it, which may be used as the predictor of the pixel itself. Let $P(i, j)=$, $i=1, \ldots, C$ be the pixel defined by the row i and the column j of whichever block, and let $P'(i,j)$, be the pixel used as predictor of $P(i, j)$ then the arrangement is defined as follows:

$P(1, 1)$=first pixel of the scanning $P'(i, 1)=P(i-1, 1)$; $i=2, \ldots, R$ $P'(i, j)=P(i, j-1)$; $i=1, \ldots, R$ and $j=2, \ldots, C$ Let $E(i, j)=P(i, j)-P'(i, j)$ be the prediction error. It is known that the whole of the prediction errors has a statistic representation that can be well approximated to a sequence of independent casual variables and identically distributed and having a Laplacian probability density. By exploiting this knowledge ahead of the prediction error it is possible to compress the latter by mapping it on a small group of values $Q(k), k=1, \ldots L$ and $L<2^B$ without introducing an excessive distortion. This mapping operation is commonly named "quantization". Supposing that each of the L values Q(k) can be coded with a number of bits C less than B (always true when for example $L=<2^C$) the binary coding of each pixel subjected to the predictive process is compressed by a factor C/B.

The ADPCM compression method is applied to each block into which the picture is decomposed through the following operations: selecting and coding an appropriate quantizer in the digital stream; coding of the first pixel of the block; and decorrelating, quantizing and coding of all the remaining pixels of the block.

The various steps and the circuit architecture that carry out these operations are hereinbelow singularly described:

1) Selection and coding of the quantizer.

It is well documented that the distortion introduced by the process of quantization may be reduced if the set of quantization values Q(k) is calculated by taking into account the energy of the signal to be quantized. It is also known that different portions of a digital picture may present very different energy values. The present method defines the whole of the values Q(k) relative to each block as a function of the energy of the block itself as follows:

The whole of the values $Q1(k)k=1, \ldots, L$ utilized in the case of unitary energy are known both to the coder and to the decoder;

The U energy of the block is estimated and coded in the digital stream;

The values Q(k) effectively used by the block are calculated as:

$Q(k)=Q1(k) * U; k=1, \ldots, L$

An estimation of the block energy may be made in a relatively simple way by hypothesizing a Laplacian statistic of the prediction error. Indeed, in this case the energy may be calculated by multiplying by the square root of two the mean of the absolute values of the block prediction errors. The coding of the energy may be simply done by scaling in terms of the maximum value and by representing the result on a K number of bits, to basically realize a uniform quantization. In selecting the quantizer of the prediction errors it is also necessary to take into consideration the peak value of the errors of quantization, because in the case of large prediction errors it might occur that the peak restitution value of the quantizer, according to the scheme shown hereinbelow, be too small. Thus, simultaneously to the calculation of the variance, the peak values of the prediction for the first column error are also calculate within which, large prediction errors are likely to occur because of the greater distance among the lines of a field during the interlaced scanning, and for each group of G consecutive horizontal lines (i.e. G=2). A bit is added to the coding of each of these groups of pixels in order to signal the event of an excessive peak of prediction error, and as a result of it, the choice of a quantizer that corresponds to a 2*U energy in the case of a pair of rows and to 4*U in the case of the first column.

A circuit architecture as that illustrated in details in FIGS. 8 and 9 may be used for calculating this variance estimation.

2) Coding of the first pixel of the block

By referring to the scheme of FIG. 7, the first pixel of the block, previously indicated as P(1, 1), is not subject to any sort of prediction, thus it is coded according to its original resolution by way of B bits.

3) Decorrelation, quantization and coding of all the other pixels of the block

By referring to the scheme of FIG. 7, for each pixel of the block, the pixel P' as previously defined will be adopted as the predictor. It should be noticed that this predictor, according to the scanning order, has already been quantized and reconstructed, and therefore is not taken from the original picture. This permits a better control of the picture's quality, coherently with known ADPCM techniques.

FIG. 7 shows a circuit where, besides giving a general view of the encoder, also provides details of the prediction and quantization loop of single pixels. The calculation of the prediction error is carried out in terms of modulus and sign. This permits simplifying the quantization by halving the number of levels upon which the quantization operates. Indeed, it is known that the statistics of the prediction error is symmetric about the zero.

Figure 10:
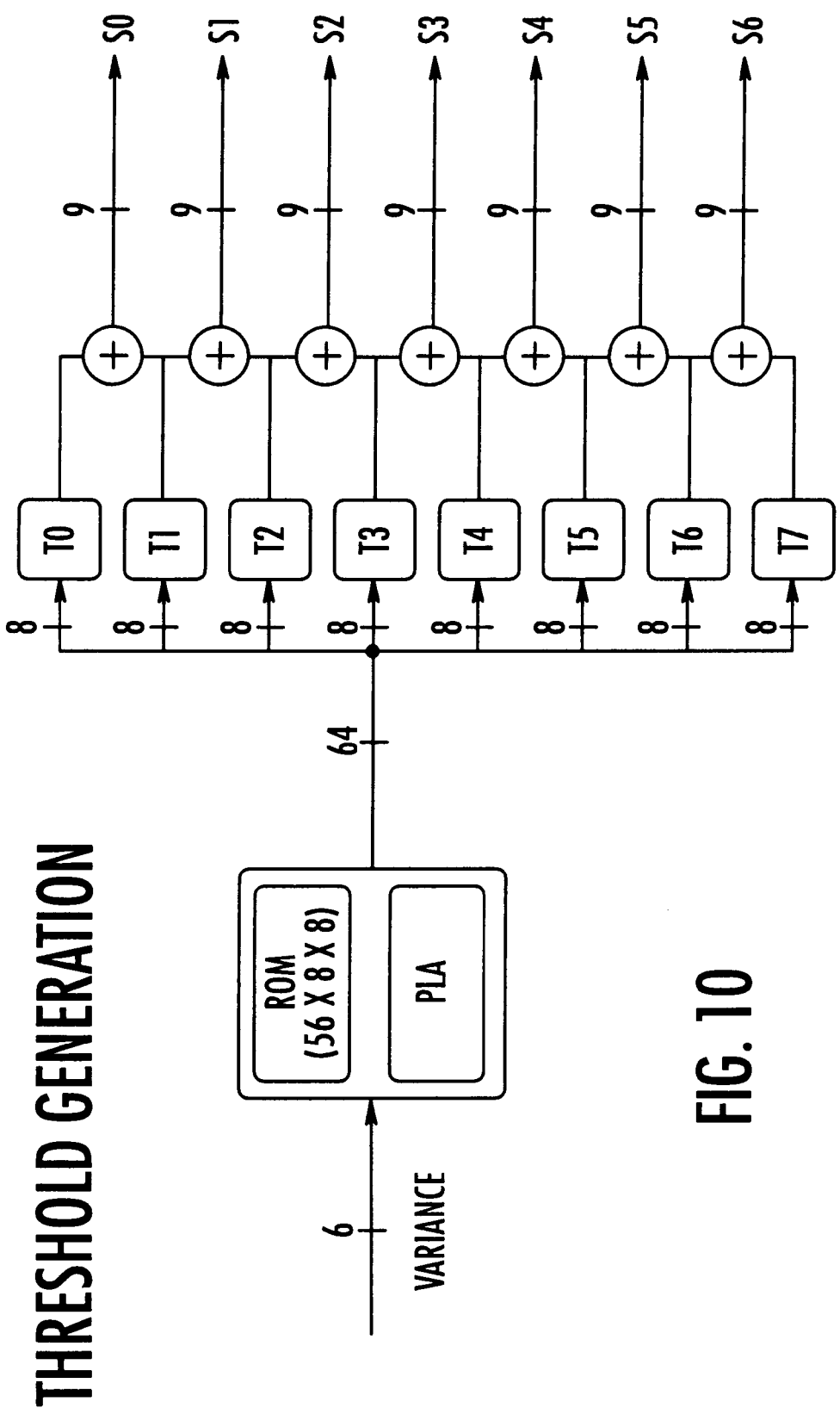
FIG. 10 is a functional scheme of a circuit that generates the quantization block threshold of the scheme shown in FIG. 3.
Figure 11:
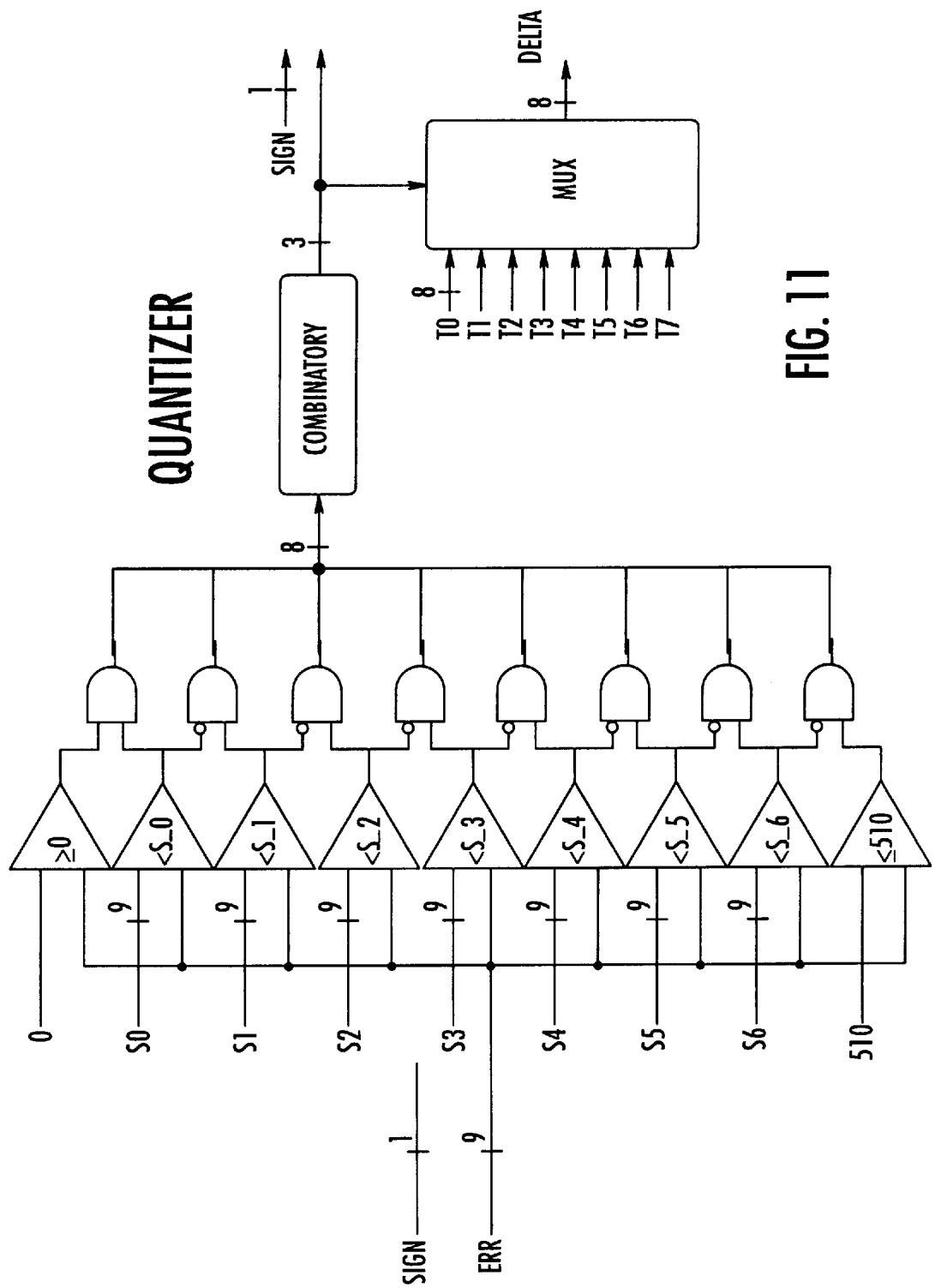
FIG. 11 is a functional scheme of a multilevel quantization circuit.

FIGS. 10 and 11 illustrate a circuit embodiment of the quantizer. The scheme of FIG. 10 shows the architecture used for generating the seven threshold values S0, S1, S2, S3, S4, S5 and S6 that represent the arithmetic mean of the restitution values $T\phi, \ldots, T7$. In particular, the mean is calculated among adjacent restitution values (i.e. S2=T2+ T3) and this result is not divided by two to maintain full accuracy. Of course this is compensated by multiplying by two the "err" value of the scheme of FIG. 11 that is in fact represented with 9 bits (i.e. 1 sign bit is added) rather than with 8 bits.

FIG. 11 shows the real quantization circuit. The threshold values calculated in FIG. 10 define a series of eight intervals of absolute value (and for the coding of the luminance with four bits), thus if "err" falls within the interval defined by S1 and S2 then "err" is replaced by the value T2 previously produced by either the PLA or by reading the ROM. Therefore, the two comparators fed with S1 and S2 drive, with the assistance of a combinatory logic, the multiplexer MUX in transferring T2 to the output, taking on the name "delta". The sign bit of "err" instead is transferred untrimmed to the output and anyway becomes the sign of "delta".

By referring again to the complete scheme of the ADPCM coder of recompression and writing on the video RAM of FIG. 7, the subsampled data so recompressed are stored in the external DRAM, which is organized in 16 bit words. Thus, the N bits that represent the coding, for example, of an 8*8 block of luminance, are aligned in 16 bit words and sent, by the use of the Memory Controller of FIG. 1, to the external DRAM. Obviously N is not a multiple of 16 bits, thus a 16 bit word does not contain useful information and it is therefore convenient to store such a word in a memory of small dimensions (as compared to those of the external DRAM) that can be realized on the chip. This particularly advantageous form of realization is indicated in the scheme of FIG. 2 by the presence of a so-called MR Memory block that represents such an auxiliary optional memory applicable on the chip.

Figure 6:
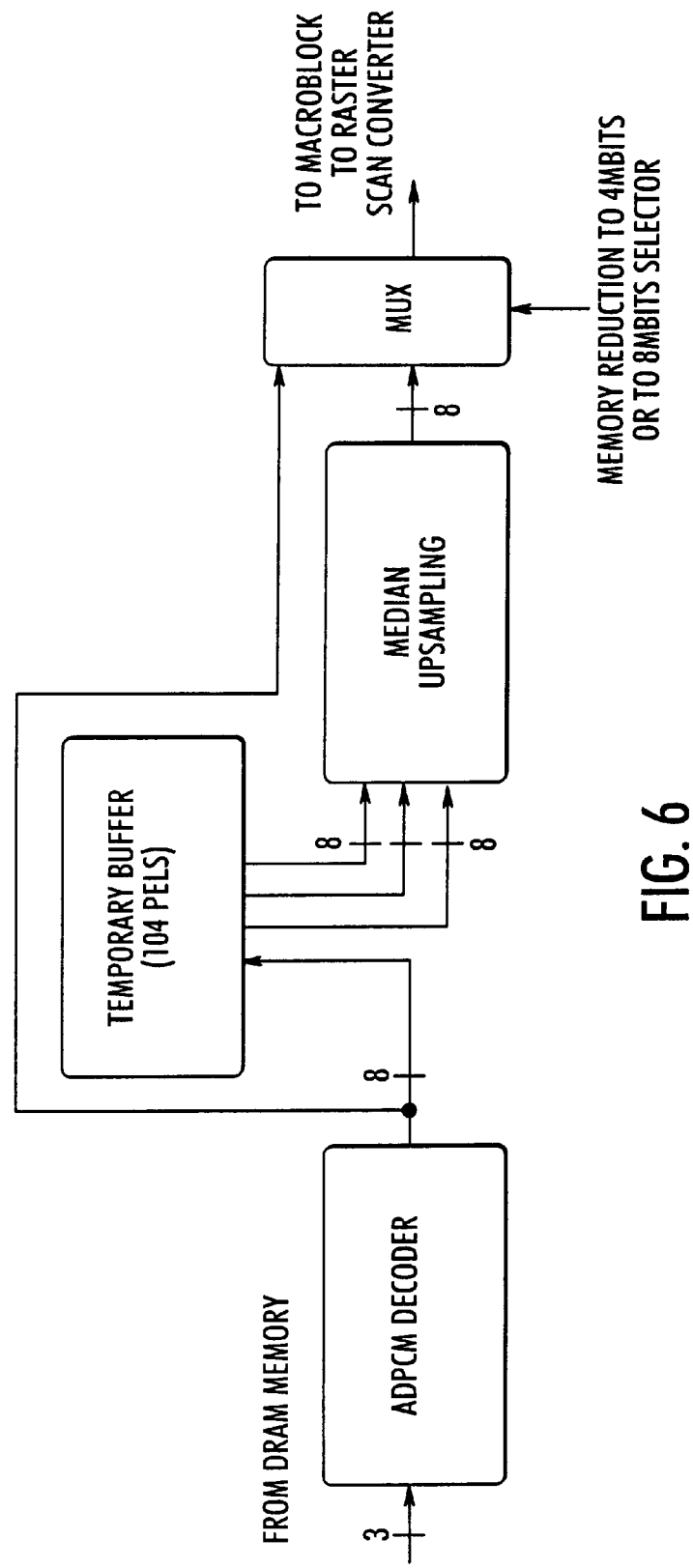
FIG. 6 is a scheme of the decoding block, ADPCM decompression, bufferization and upsampling.
Figure 12:
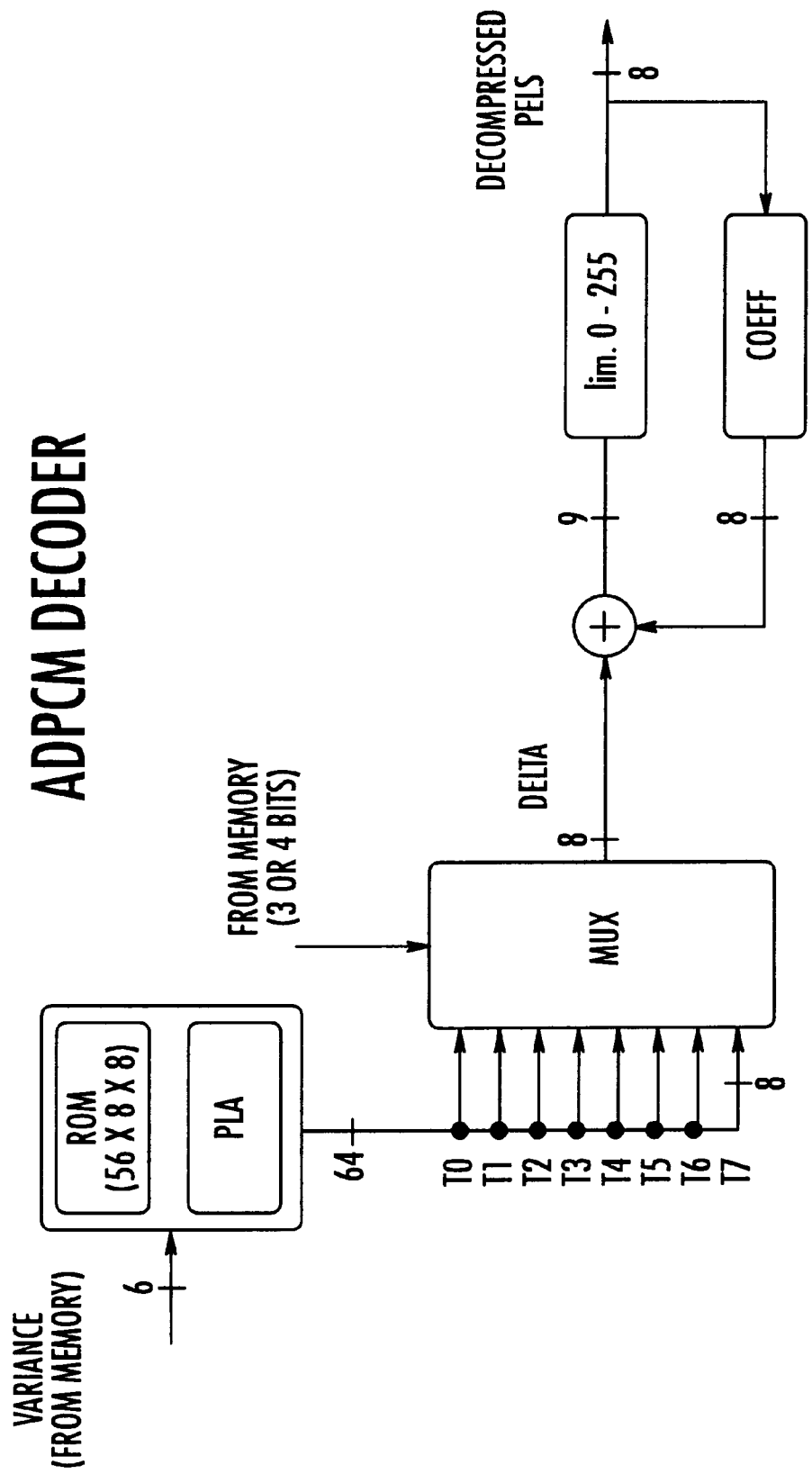
FIG. 12 shows a more detailed scheme of the ADPCM decoding and decompression circuit.

The MR decoder block is shown in FIG. 6 where there is also the selection multiplexer of the subsampling for reducing to 4 Mbits the memory or otherwise for disabling this algorithm when is required a memory reduction to 8 Mbits through the ADPCM recompression alone. The architecture of the ADPCM Decoder block of the scheme of FIG. 6 is thoroughly shown in FIG. 12.

Let us suppose to read from the memory the N bits as referred to above. The variance as calculated therefrom selects (that is aims one of the stored values), a value stored in the ROM (or the PLA). Therefore, the values T$\phi$, T1, T2, T3, T4, T5, T6, and T7 are produced, which feed the multiplexer MUX. Subwords of 4 bits (in the case of luminance decompression) are drawn from the N bits and they drive the MUX in selecting the T values.

Finally, the current T value, besides becoming the decompressed pel, also becomes the value to be added to the next value selected by the MUX. This process is initialized by the first pel of the 8*8 block which is not affected by the compression or decompression.

EXAMPLE OF COMPRESSION WITH N BITS PER PIXEL

Let us consider an R*C block of pixels after eventual motion compensation and after the quincunx subsampling. The total number of bits utilized for the compression of the block is:

$$K+8+(R*C-1)*N+1+R/G$$

where:
K=bits employed for coding the energy
8=bits used for the first scanned pixel
N=bits used for the quantization
(R*C-1)*N=bits employed for the DPCM coding of the remaining pixels
1=bit for indicating the altered quantizer in the first column
R/G=bit for indicating the altered quantizer in the R/G groups of rows.

For the case K=6, R=8, C=8, N=3, G=2 we obtain a total of:

$$6+8+(8*8-1)*3+1+8/2=208 \text{ bit/block}$$

In the case K=5, R=8, C=8, N=2, G=2 we obtain a total of:

$$5+8+(8*8-1)*2+1+4=144 \text{ bit/block}$$

compared to the 8*8*8=512 required by the chroma original representation and differently from the 16*8*8=1024 needed for the luma.

EXAMPLE OF COMPRESSION OF AN MPEG MACROBLOCK

Each macroblock is made up of four 8*8 blocks of luminance and of two 8*8 blocks of chrominance; each macroblock is coded with a number of bits equal to:

$$(2 * 16 * 8 * 8) + (2 * 8 * 8 * 8) = 3{,}072 \text{ bits}$$
$$\text{luma} \qquad\qquad \text{chroma}$$

In each PAL picture there are 1.620 macroblocks:

$$3.072*1.620=4976640 \text{ bits}$$

It is known that the chrominance signal has a lower content of information, presenting a band restricted to the lowest spatial frequencies. This implies a greater predictability of the chrominances themselves, that is, a greater efficiency of the ADPCM compression. By considering a 3 bit/pixel compression for the luminance and a 2 bit/pixel for the chrominance we would then obtain:

$$(2 * 208) + (144 * 2) = 704 \text{ bits}$$
$$\text{luma} \qquad\quad \text{chroma}$$

Therefore, each frame occupies:

$$704*1{,}620=1{,}140{,}480 \text{ bits}$$

The macroblock compression factor so obtained is equal to 4.36.

EXAMPLE OF APPLICATION TO AN MPEG DECODER

By taking into account the above relationships it is possible to reach the target for a reduction to 4 Mbits of the video memory register by assuming such compression of the MPEG decompressed I and P pictures.

This result is attained by first quincunx subsampling and then ADPCM recompressing the I and P pictures after MPEG decompression and before they are stored in the external memory. They will be then decompressed when read from the external memory as shown in FIG. 1.

The compression is applicable to an 16*8 block output from the I_DCT and from motion compensation, according to an adaptive DPCM scheme. In particular, in the considered example, for the 16*8 blocks of luminance a 3 bits compression is selected, whereas for the 8*8 blocks of chrominance a 2 bits compression is selected.

Thus, for the PAL format case the memory requisite is as follows:

$$1{,}835008 + 835{,}584 + 1{,}140{,}480 + 1{,}140{,}480 = 4{,}951{,}552 \text{ bits} \;(\rightarrow 4{,}722 \text{ Mbits})$$

compressed and subsampled P buffer
I compressed and subsampled I buffer

For a NTSC format the requisite would then be of 4,571,392 bits.

Figure 14:
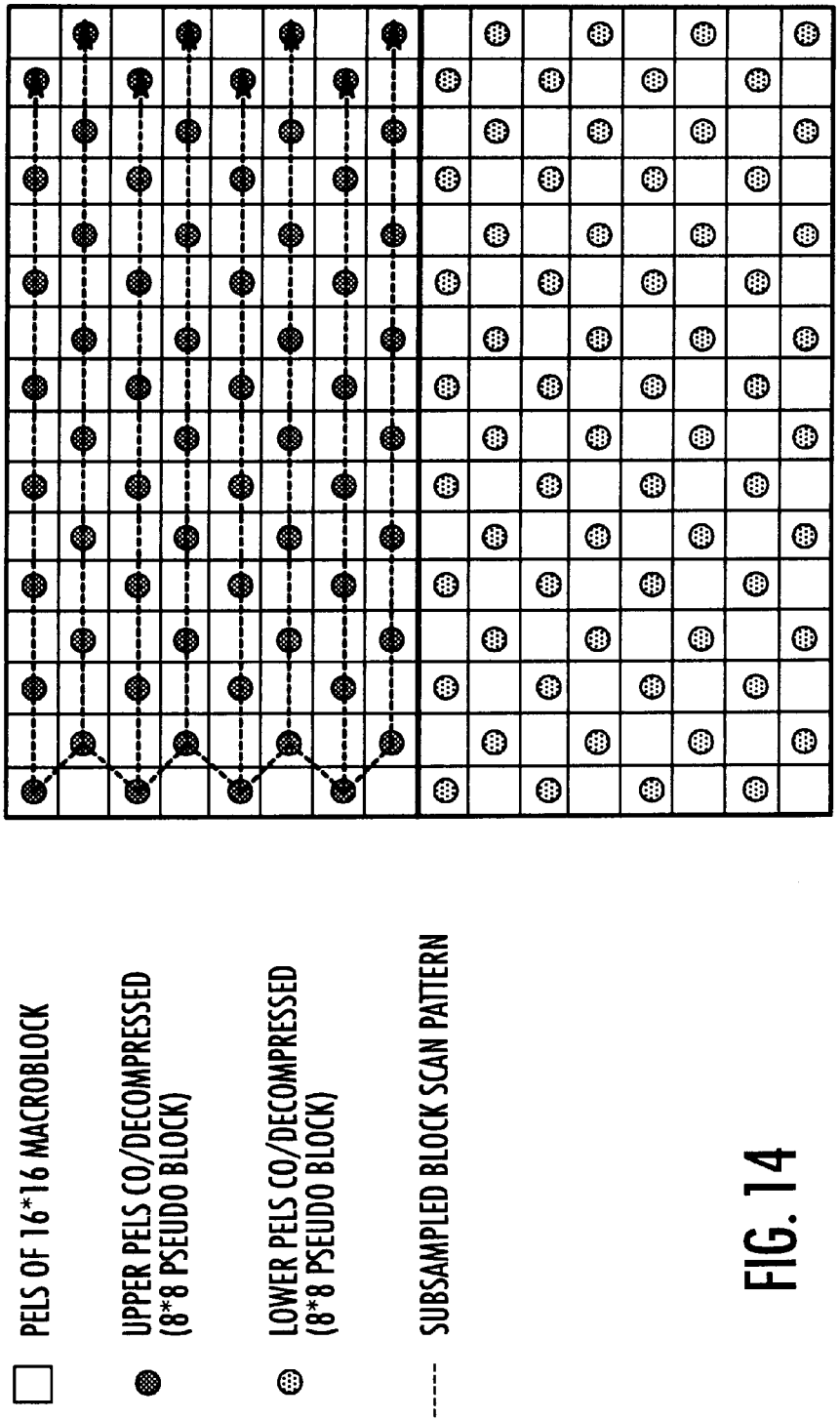
FIG. 14 shows the scanning of a 16*16 luminance macroblock outcoming from the I_DCT; after the subdividing in two points and an 8*8 subsampling and ADPCM compression.
Figure 16:
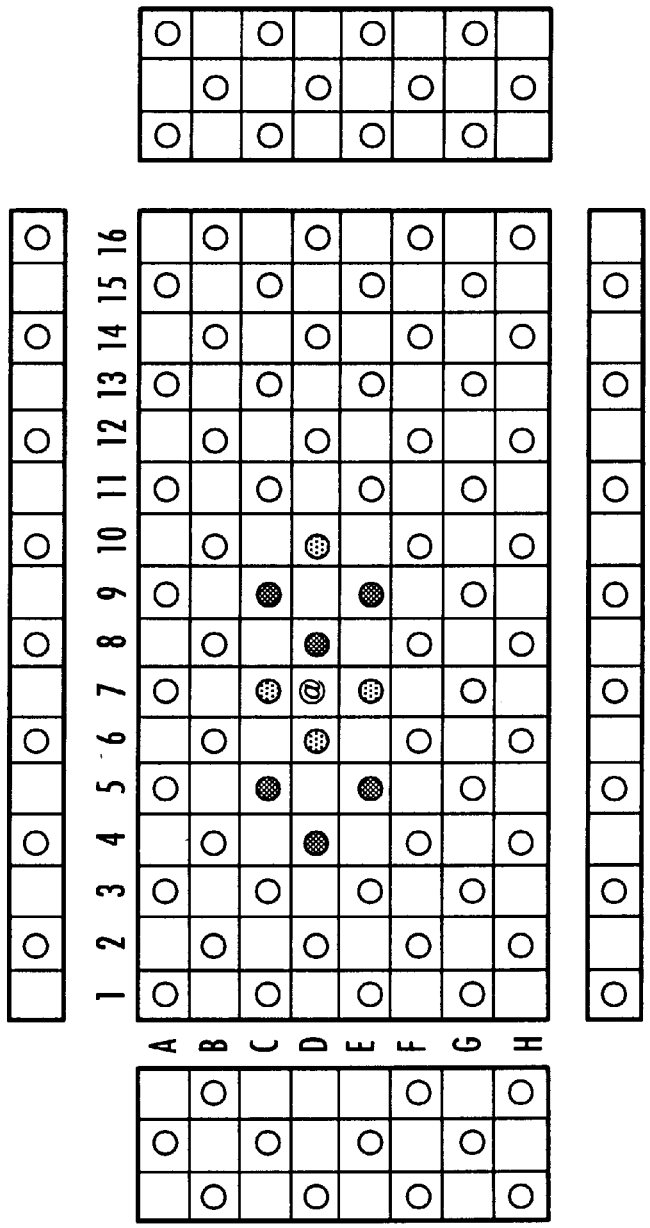
FIG. 16 depicts the surrounding pels needed for the reconstruction of the perimetral pels of the 16*8 window.

An illustration of the processes of subsampling/upsampling and ADPCM compression/decompression is illustrated in FIGS. 14 to 16. The MPEG decompressed digital image following to the inverse cosine discrete transform is in macroblock format, constituted by 16*16 pels for the luminance component and by two 8*8 pels for each luminance component U and V. These blocks, as shown by the block diagram of FIG. 3, are bufferized and broken down into two blocks of 16×16 pels for the case of the luminance component.

Each of these (for the luminance alone) is subsampled according to a grid commonly referred to as quincunx, as shown in FIG. 14. A new block of 8*8 pels is so obtained. This block feeds the ADPCM Encoder block of FIG. 3, according to the scanning path shown in FIG. 14 by the dashed line. Thereafter the ADPCM compression take place as already described above.

After having ADPCM decompressed such a block, during successive step of the decodification of the picture date, the data are upsampled, meaning that samples which were not stored during the coding phase have to be reconstructed. To do this, use is made of the adjoining samples included in a properly defined processing area, as schematically shown in FIG. 15.

In the example depicted in FIG. 15, a nonexistent @ pixel must be constructed. This pel is calculated using the formula indicated at the foot of the page in FIG. 15, where c0, c1, c2, c3, c4, c5 and c6 are the multiplying coefficients of the following pels:

D4 is a ADPCM decompressed pel;

D5 is a pel created through median filtering of the D4, C5 and E5 pels in which the median filtering consists of choosing the intermediate pel among the incoming three pels (if for instance D4<C5<E5, the median is C5);

D6 is an ADPCM decompressed pel;

D7 is a pel created through median filtering of the D6, C7 and E7 pels;

D8 is an ADPCM decompressed pel;

D9 is a pel created through median filtering of the D8, C9 and E9 pels; and

D10 is an ADPCM decompressed pel.

Therefore, in order to reconstruct a 16*8 block, as similar as possible to that subjected to subsampling and ADPCM compression in a coding phase, the 8*8 subsampled block is ADPCM decompressed and is thereafter upsampled through the above mentioned filtering.

By considering that the chrominance component is made up of 8*8 blocks of low energy content if compared to the luminance blocks, a choice may be made to minimize the image quality loss by using for the chrominance alone the ADPCM recompression of the 8*8 block, in line with what already described in the European Patent application No 96830106.9. The number of bits/pixel may be 2.

The median filtering, that is, the median upsampling during the decoding phase of ADPCM decompressed data is undertaken by the MEDIAN UPSAMPLING block of the functional scheme of FIG. 6.

Figure 13:
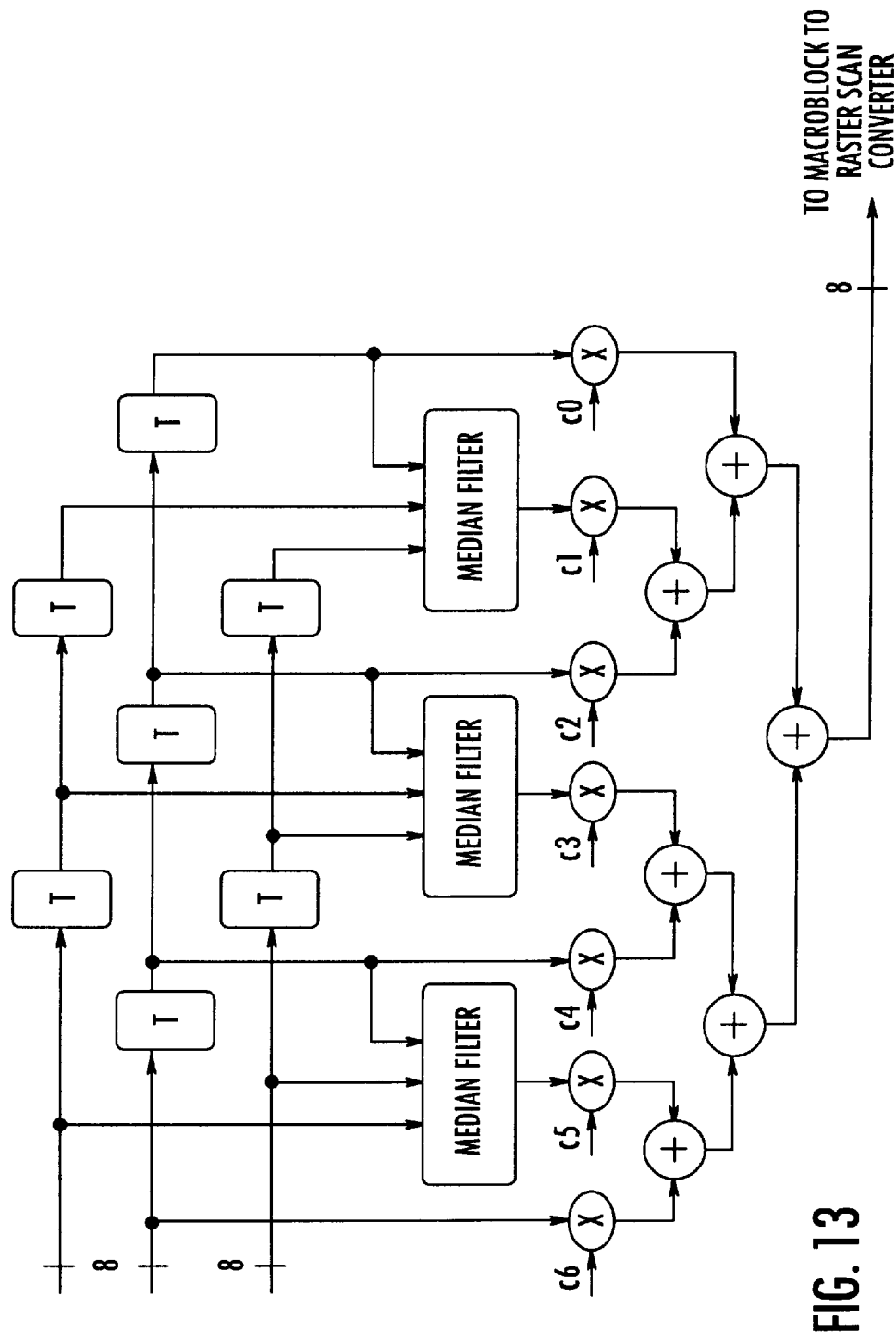
FIG. 13 is a detailed scheme of the upsampling block.

FIG. 13 shows a practical form of realization of the median filtering circuit. The pixels belonging to three adjacent video lines are fed via the respective input lines of the circuit of FIG. 13. The delay blocks T may be constituted by D-flip/flops that store the pixels present on the same input line, thus creating the following arrangement:

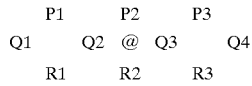

Therefore, the P1, Q1, R1 values or pels feed the median filter, which in turn outputs the intermediate pel of the three pels (for example P1=1, Q1=10, R1=100−OUT=10). Of course, all the other median filters perform the same process.

The values Q1, M1, Q2, M2, Q3, M3, Q4 are thus obtained at the output. These values are respectively multiplied by c0, c1... c6 and added together in order to produce an interpolated pixel value between Q2 and Q3 and equal to @.

I claim:

1. A method for reducing the video memory requisite of an MPEG decoder of a type comprising a decompression stage of the respective I, P and optionally B pictures of an MPEG compression algorithm, the data relative to which is stored in respective buffers organized in the video memory, the method comprising the steps of:

subsampling and recompressing at least the I and P pictures after MPEG decompression and before storing the relative data in the respective buffers of the video memory, estimating a variance of each subsampled block of n*m pels relative to a discrete cosine transform of decompressed picture data, multiplying a value of the variance of each subsampled block by a set of coefficients or utilizing the value of the variance as an address of a ROM or as an input signal of a PLA to configure a multilevel adaptive quantizer and coding a first pel of each subsampled block with a p number of bits, the estimated value of the variance with a n-h number of bits, where h is an integer number greater than zero, and the differences between each other pel following the first pel and the median value of all the pels of the block with p-k number of bits, where k is an integer number greater than zero, according to an adaptive pulse code modulation scheme (ADPCM);

storing the data relative to the I and P pictures in the form of subsampled and recompressed blocks so coded in respective buffers of the video memory;

decoding the stored data relative to subsampled and recompressed blocks of pels relative to the I and P pictures;

decompressing data relative to the blocks of pels according to the adaptive differential pulse code modulation scheme (ADPCM); and upsampling the decoded and decompressed data by reconstructing blocks of pels sending them to the conversion circuit macroblock to raster scan.

2. The method according to claim 1, wherein an amount of video memory requisite reduction is modulatable by enabling the ADPCM recompression algorithm and coding before writing of data in the video memory and by decoding and ADPCM decompressing the same data read from the video memory to realize a first reduction of the video memory requisite and enabling the data subsampling algorithm before the ADPCM recompression and median upsampling of the ADPCM decompressed data to implement a maximum reduction of the memory requisite.

3. An MPEG video decoder for interfacing with a control bus and a data processing bus for video pictures to be written and read in respective buffers of an external video memory, said MPEG video decoder comprising:

a first first-in-first-out buffer for data acquisition and writing of compressed data in a first bit buffer of the external video memory;

a Start Code Detector circuit synchronized by a controller;

a bidirectional buffer for on screen display data;

a variable length decoder of the compressed data input stream;

an MPEG decompression block of the data decoded by said variable length decoder, comprising a run length decoder, an inverse quantizer circuit, an inverse discrete cosine transform processor, a predictor generating circuit, a macroblock scan to raster scan conversion circuit for a current B-picture upstream of a display unit;

a bufferization and quincunx subsampling circuit of the data output by said inverse discrete cosine transform processor;

a coding and recompression circuit according to an adaptive differential pulse code modulation scheme circuit that recompresses the data relative to at least the I and P pictures of the MPEG algorithm and codes the recompressed data to be stored in the respective buffers of the memory;

a decoding and decompressing circuit of the data relative to said I and P pictures read from the respective buffers of the memory and generating a stream of decoded and decompressed data relative to the I and P pictures;

a bufferization and median upsampling circuit of the decoded and decompressed data stream;

first multiplexing means enabling/disabling said bufferization and quincunx upsampling circuit, and of said bufferization and median upsampling circuit;

second multiplexing means enabling/disabling said ADPCM recompressing, coding, decoding and ADPCM decompressing circuits; and means capable of implementing the selections of the enabling/disabling states of said first and second multiplexing means via command signals sent through the control bus.

* * * * *